US012421025B1

(12) United States Patent
Coombs

(10) Patent No.: US 12,421,025 B1
(45) Date of Patent: Sep. 23, 2025

(54) BIN HANDLE

(71) Applicant: Jahnhoy Zeon Benjamin Coombs, Toronto (CA)

(72) Inventor: Jahnhoy Zeon Benjamin Coombs, Toronto (CA)

( * ) Notice: Subject to any disclaimer, the term of this patent is extended or adjusted under 35 U.S.C. 154(b) by 0 days.

(21) Appl. No.: 18/612,885

(22) Filed: Mar. 21, 2024

Related U.S. Application Data

(60) Provisional application No. 63/608,080, filed on Dec. 8, 2023.

(51) Int. Cl.
*B65F 1/14* (2006.01)

(52) U.S. Cl.
CPC .................................. *B65F 1/1452* (2013.01)

(58) Field of Classification Search
CPC .... B65F 1/1473; B65F 1/1468; B65F 1/1452; B25G 3/20; B25G 3/12; B62B 5/06; A45F 5/10; A45F 2005/1066; B65G 7/12
See application file for complete search history.

(56) References Cited

U.S. PATENT DOCUMENTS 2,997,326 A * 8/1961 Daum .................... A01K 55/00 294/118
4,807,916 A * 2/1989 Erickson .................. B62B 5/06 294/27.1
5,704,092 A * 1/1998 Nicollet ................. A47J 45/10 220/759
12,226,007 B2 * 2/2025 Williamson ............ B62B 5/067
2011/0173778 A1 * 7/2011 Wales ...................... B25G 3/20 16/426
2015/0183451 A1 * 7/2015 Stierli ..................... B62B 9/206 16/421
2023/0348182 A1 * 11/2023 Costa Marques et al. .................. B65F 1/1473

* cited by examiner

*Primary Examiner* — Javier A Pagan

(57) ABSTRACT

The present invention provides innovative extension grips for the wheelie bin handle to keep your hands clean and free of contamination. The extension grip comprises a frame, a fixed handle, a pull handle, a clamp, a hook, and a connecting rod connecting the pull handle with the clamp. When a user squeezes a lever of pull handle of the extension grip, the clamp will close, providing the user with a secure grip of the wheelie handle. After moving the wheelie bin to the desired location, the user releases the lever of pull handle, the clamp will open.

7 Claims, 10 Drawing Sheets

BIN HANDLE

CROSS REFERENCE TO RELATED APPLICATIONS

The present application claims priority to U.S. Provisional Patent Application Ser. No. 63/608,080 filed on Dec. 8, 2023, the contents of which are incorporated herein by reference.

FIELD OF THE PRESENT INVENTION

The present invention relates generally to waste disposal. More specifically, the present invention relates to an extension grip of the wheelie bin handle.

BACKGROUND OF THE PRESENT INVENTION

Wheelie bins are widely used to dispose trash and recyclables, and most people simply grab the bins by the handle to move the bins which is quite unsanitary. It is an object of the present invention to address this issue by providing users with an extension grip of the wheelie bin handle to keep the user's hands clean and free of contamination.

SUMMARY OF THE PRESENT INVENTION

The present invention relates to an innovative extension grip for the wheelie bin handle to keep your hands clean and free of contamination. When a user squeezes a lever of pull handle of the extension grip, a clamp will close, providing the user with a secure grip of the wheelie handle. After moving the wheelie bin to the desired location, the user releases the lever of pull handle, the clamp will open.

An objective of the present invention is to provide an extension grip of a wheelie bin handle with the functions mentioned above. The extension grip comprises a frame, a fixed handle, a pull handle, a clamp, a hook, and a connecting rod connecting the pull handle with the clamp. The frame has a U shape which includes a horizontal section and two handle extensions perpendicular to the horizontal section.

The fixed handle is supported by the upper parts of the two handle extensions, forming a handle grip. The fixed handle is placed above the pull handle. Each of the handle extensions has a track parallel to the longitudinal length of the handle extension. The two tracks face each other for hosting the pull handle slidable along the tracks.

The clamp comprises a fixed grip and a moving grip. The fixed grip and the hook are connected by an adjoining section into one piece, which is so called the fixed grip with hook. The adjoining section is attached to the down facing surface of the horizontal section of the frame in such a way that the fixed grip and the hook are fixed to the horizontal section of the frame through the adjoining section. The hook is in an upper turned U shape, and the fixed grip and the hook are located on opposite sides of the frame.

The hook is designed to keep your hands clean from viruses, bacteria, and germs. The hook has multiple functions. The hook may go under the overhang lip of the recycling and garbage bins to carry them without your hands touching the bin surface. The hook may be used to lift garbage bin lids up and to lower them down. The hook may also be used to carry garbage and/or recycling bags.

The moving grip is movable up and down, performing clamp function. The horizontal section of the frame has a first central hole located in the center of the horizontal section. The adjoining section has a second central hole. After attaching the adjoining section to the down facing surface of the horizontal section of the frame, the first and the second central holes are aligned with each other. Passing through the first and the second central holes, the connecting rod has one end attached to the pull handle and the other end attached to the moving grip such that the movement of the moving grip of the clamp is controlled by the sliding movement of the pull handle along the track of the frame.

BRIEF DESCRIPTION OF THE DRAWINGS

The extension grips are the disclosure herein of exemplary embodiments of the present invention. It is distinctly claimed in the claims at the conclusion of this patent description. The forgoing and other features and advantages of the present invention will become more apparent from the following detailed description taken in conjunction with the accompanying drawings.

DETAILED DESCRIPTIONS OF THE INVENTION

All illustrations of the drawings are for the purpose of describing selected versions of the present invention and are not intended to limit the scope of the present invention.

Reference will be made in detail to exemplary embodiments of the invention, which are illustrated in the accompanying drawings. Wherever possible, the same reference numbers will be used throughout the drawings to refer to the same or like parts.

The present invention works on an extension grip of the wheelie bin handle to keep the user's hands clean and free of contamination. Although the invention has been explained in relation to its preferred embodiment, it is to be understood that many other possible modifications and variations can be made without departing from the spirit and scope of the invention.

Figure 1:
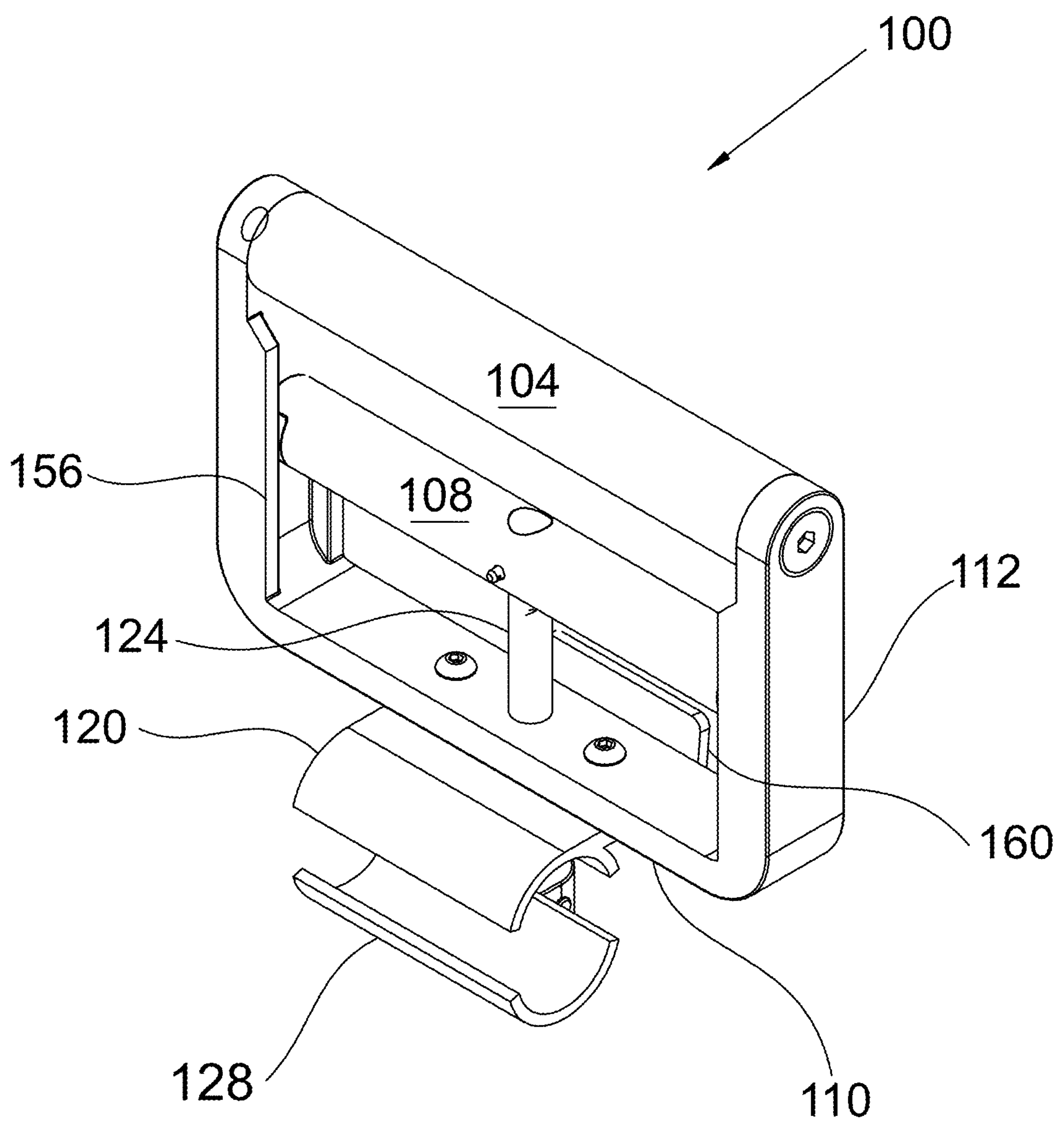
FIG. 1 is an isometric view of an extension grip for the wheelie bin handle according to one of the embodiments of the present invention.

Referring to FIG. 1, there illustrated is an isometric view of an extension grip 100 for the wheelie bin handle according to one of the embodiments of the present invention. Extension grip 100 comprises a U-shaped frame, two handlebars including a fixed handle 104 and a pull handle 108, a clamp including a fixed grip 120 and a moving grip 128, a connecting rod 124, and a hook 160.

As shown in FIG. 1, the frame includes a horizontal section 110 and two handle extensions 112 which are perpendicular to the horizontal section 110. Each of the handle extensions 112 has a track 156 parallel to the longitudinal length of the handle extension 112. The tracks 156 face each other for hosting the pull handle 108 slidable along the tracks 156.

Figure 2:
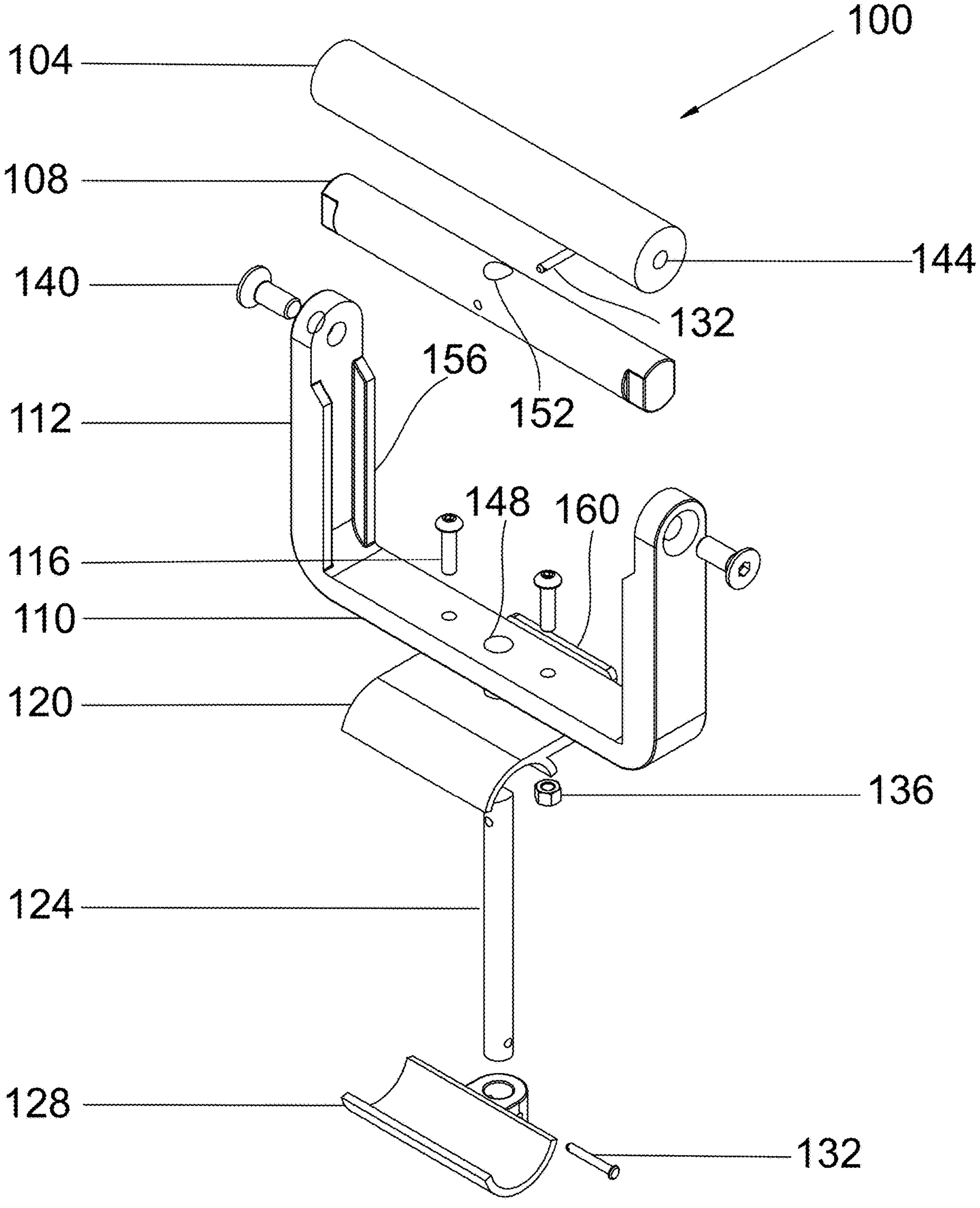
FIG. 2 is an exploded view of the extension grip for the wheelie bin handle according to the embodiment of the present invention.

Referring to FIG. 2, there illustrated is an exploded view of the extension grip 100 for the wheelie bin handle according to the embodiment of the present invention. As shown in FIG. 2, the horizontal section 110 of the frame has a central hole 148 located in the center of the horizontal section. Passing through the central hole 148, the connecting rod 124 has one end of the rod connected to the pull handle 108 and the other end of the rod connected to the moving grip 128 of the clamp. Thus, the movement of the moving grip 128 is controlled by the sliding movement of the pull handle 108 along track 156 of the handle extensions 112.

Referring to FIG. 2 again, the fixed handle 104 is supported by the upper parts of the handle extensions 112. Each of the two handle extensions 112 includes a socket located at the upper part of the handle extension 112 and each end of the fixed handle 104 has a counter sink 144. The end of the fixed handle 104 is attached to the corresponding upper part of the handle extension 112 by a socket counter sunk screw 140 screwed through the socket into the counter sink 144.

As shown in FIG. 2, the clamp constitutes a fixed grip 120 and a moving grip 128. The fixed grip 120 is attached to the down facing surface of the horizontal section 110 of the frame by using two hexagon socket button head screws 116 and hexagon nuts 136. Two head screws 116 pass through side holes in the horizontal section 110 and pass through the fixed grip 120 before being screwed with the hexagon nuts 136 so that the fixed grip 120 of the clamp is attached to the down facing surface of the horizontal section 110 of the frame.

Referring to FIG. 2 again, the connecting rod 124 is perpendicular to the handlebars. The rod 124 passes through the central hole 148 in the horizontal section 110 of the frame with one end of the rod 124 attached to the pull handle 108 and the other end of the rod 124 attached to the moving grip 128 of the camp. The moving grip 128 of the clamp is movable up and down, performing a clamp function. The movement of the moving grip 128 is controlled by the sliding movement of the pull handle 108 along the track 156.

Figure 3:
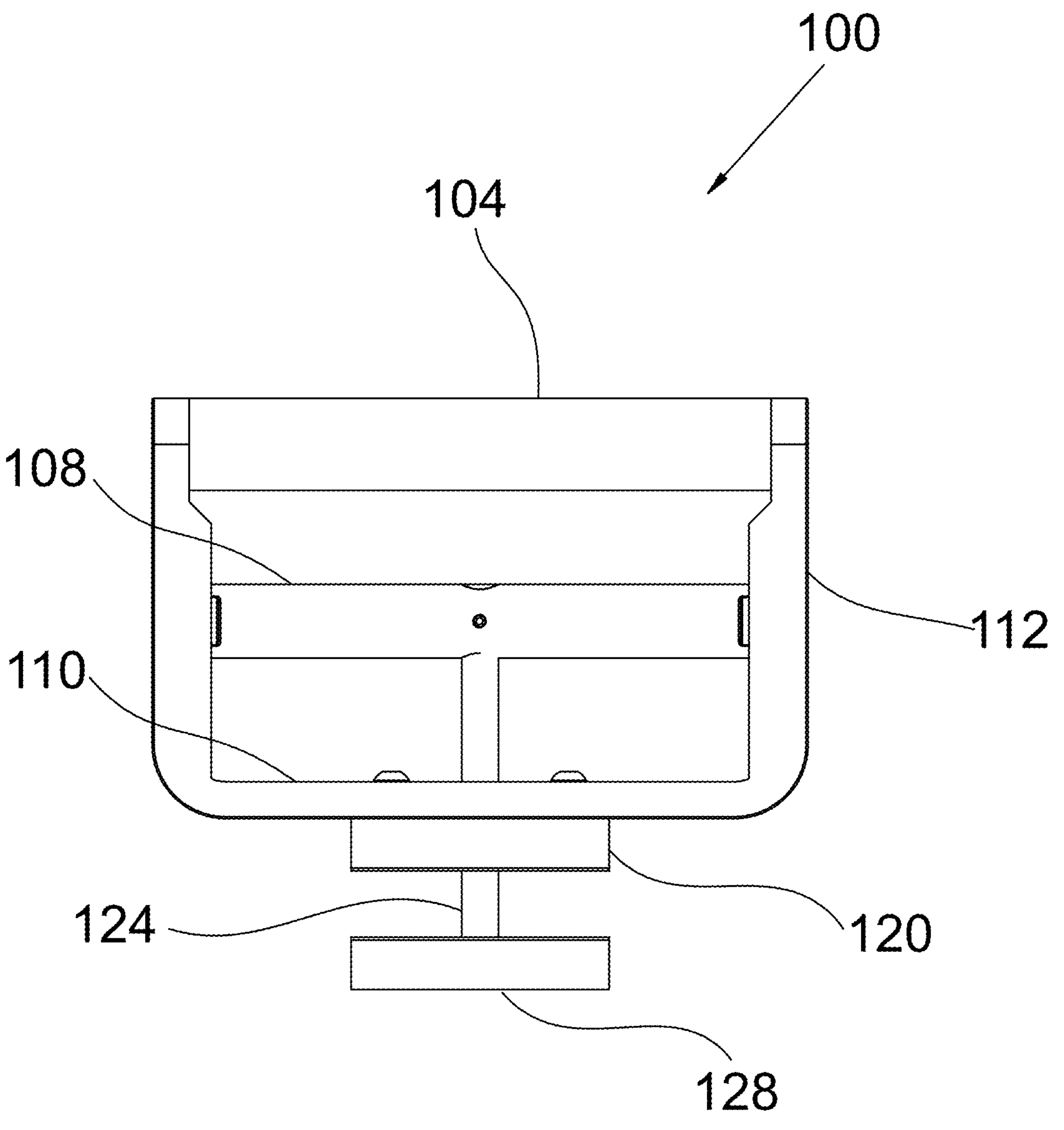
FIG. 3 is a front view of the extension grip for the wheelie bin handle according to the embodiment of the present invention.

Referring to FIG. 3, there illustrated is a front view of the extension grip 100 for the wheelie bin handle according to the embodiment of the present invention. As shown, the fixed handle 104 is located above the pull handle 108. Both ends of the fixed handle 104 are supported by the handle extensions 112. Ends of the pull handle 108 are reshaped to fit into the tracks which are aligned parallel to the handle extensions 112. The connecting rod 124 is located at the center of horizontal section and perpendicular to the handlebars. One end of the connecting rod 124 is attached to the pull handle 108 and the other end of the connecting rod 124 is attached to the moving grip 128 of the clamp. The fixed grip 120 of the clamp is attached to the down facing surface of the horizontal section 110.

Figure 4:
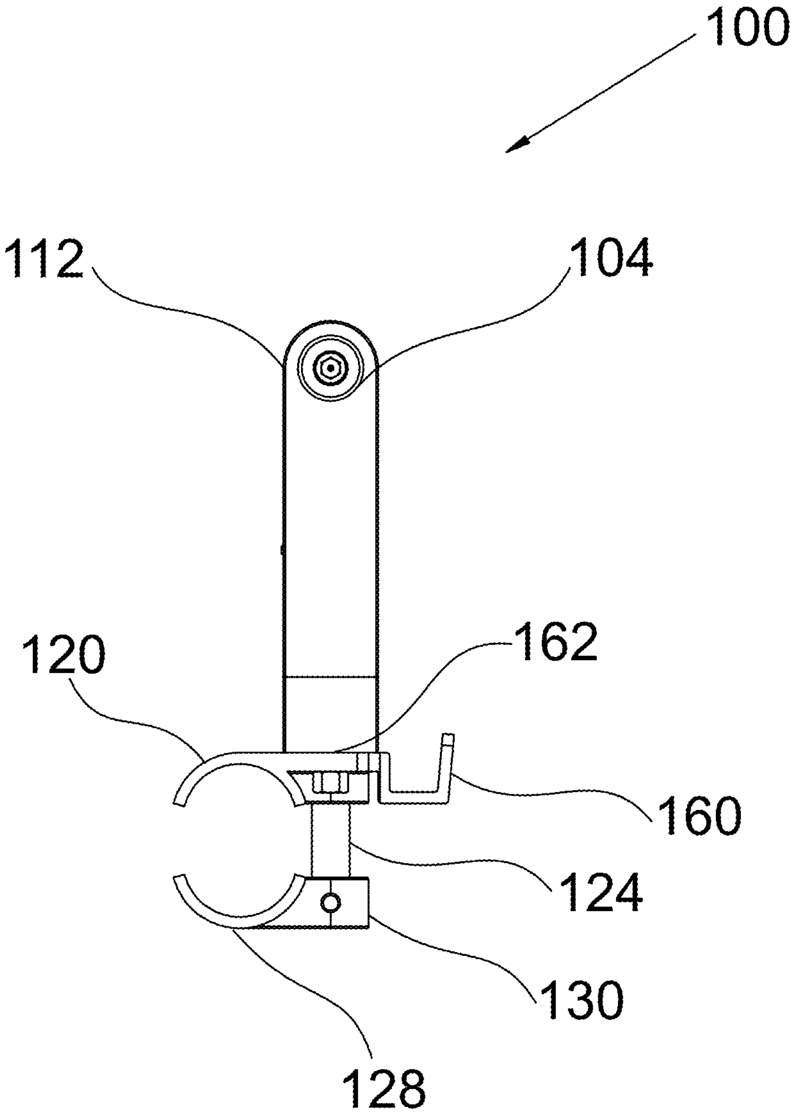
FIG. 4 is a side view of the extension grip for the wheelie bin handle according to the embodiment of the present invention.

Referring to FIG. 4, there illustrated is a side view of the extension grip 100 for the wheelie bin handle according to the embodiment of the present invention. As shown, the fixed handle 104 is attached to the handle extension 112 by the socket counter sunk screw. The fixed grip 120 and the moving grip 128 are positioned to form a round shape for clamping the handle of the wheelie bin. One end of the connecting rod 124 is attached to the moving grip 128 by a clevis pin with a head. The connecting rod 124 aligns parallel to the handle extension 112.

Referring to FIG. 4 again, the fixed grip 120 of the clamp and the hook 160 are made from one piece of material which is so called fixed grip with hook. Passing through a central hole 164 (see FIG. 10) located in an adjoining section 162 which connects the fixed grip 120 and the hook 160 and another central hole 148 in the horizontal section 110, the connecting rod 124 is attached to the pull handle 108. The adjoining section 162 is attached to the down facing surface of the horizontal section 110 of the frame. The moving grip 128 includes a support 130. The support 130 has an opening to hold the connecting rod 124, which is fixed to the support 130 by the clevis pin 132 with head.

Figure 5:
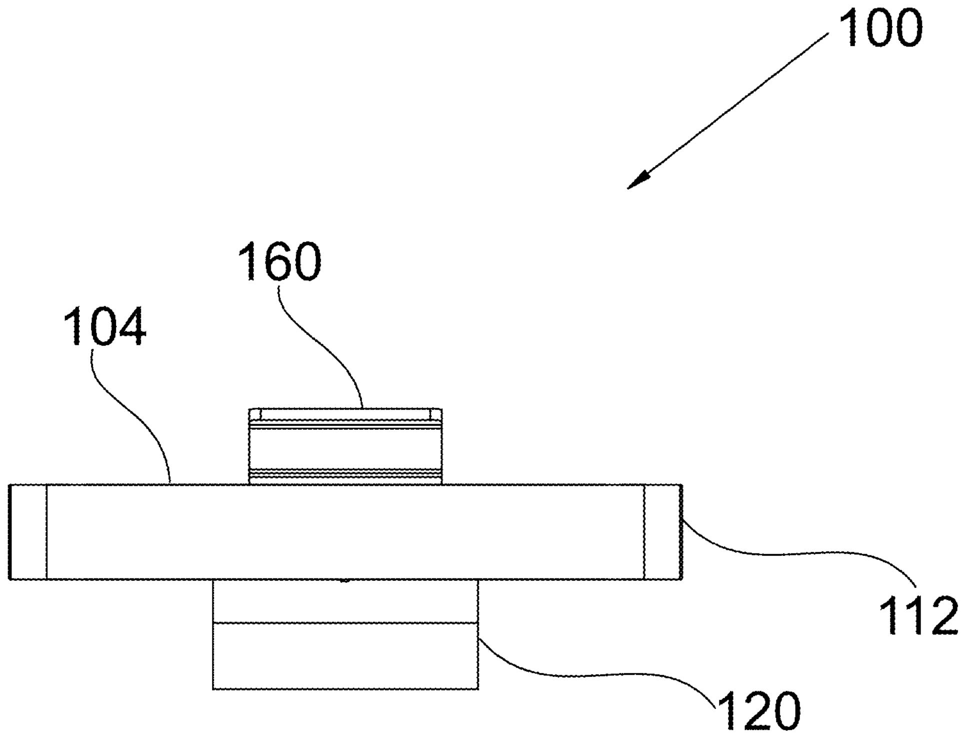
FIG. 5 is a top view of the extension grip for the wheelie bin handle according to the embodiment of the present invention.

Referring to FIG. 5, there illustrated is a top view of the extension grip 100 for the wheelie bin handle according to the embodiment of the present invention. As shown in FIG. 5, the fixed handle 104 is supported on the handle extension 112 of the frame. The fixed grip 120 is in the front of the fixed handle 104 while the hook 160 is in the back of the fixed handle 104.

Figure 6:
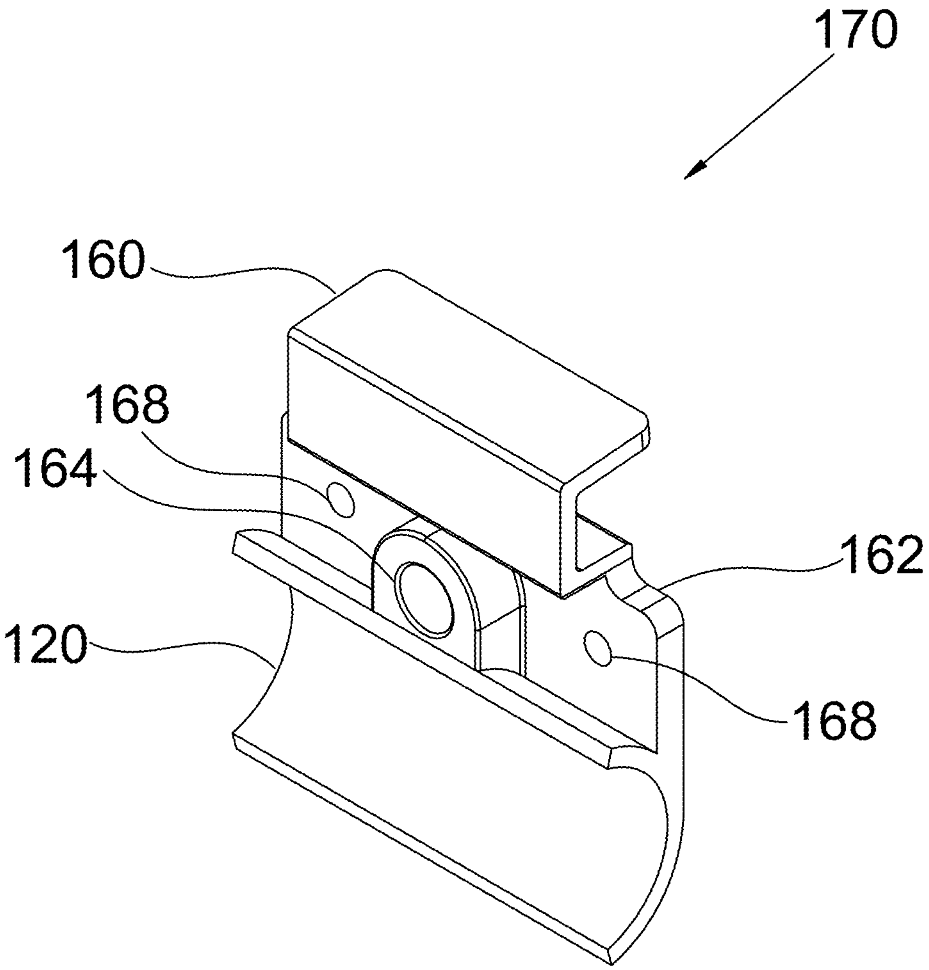
FIG. 6 is an isometric view of a fixed grip with hook according to the embodiment of the present invention.

Referring to FIG. 6, there illustrated is an isometric view of a fixed grip with hook 170 according to the embodiment of the present invention. The fixed grip with hook comprises the fixed grip 120 and the hook 160, which are made into one piece of material by an adjoining section 162. The fixed grip with hook 170 further includes the central hole 164 and the two side holes 168. One end of the connecting rod 124 passes through the central hole 164 before being connected with the pull handle 108. The two head screws 116 pass through side holes in the horizontal section 110 and side holes 168 before being screwed with the hexagon nuts 136 so that the fixed grip with hook 170 is attached to the down facing surface of the horizontal section 110 of the frame.

Figure 7:
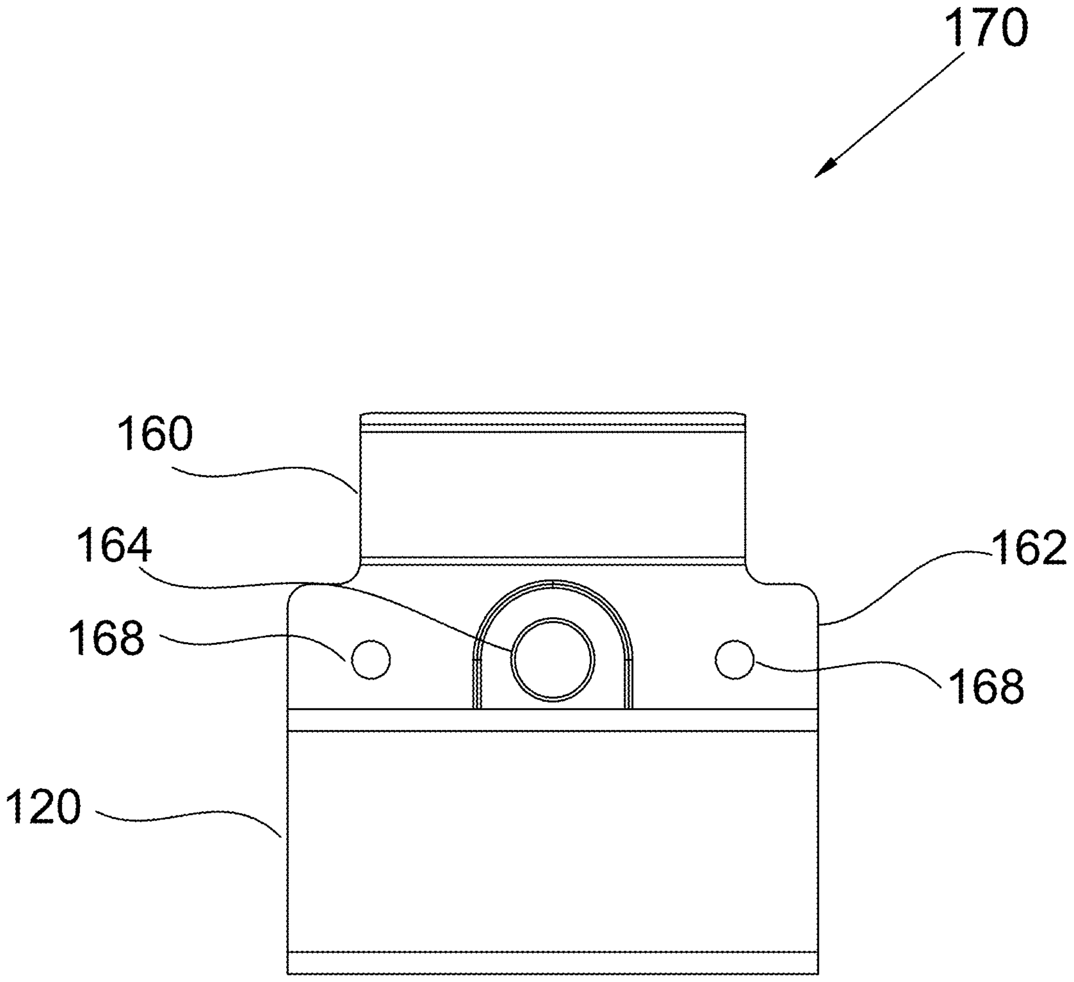
FIG. 7 is a front view of the fixed grip with hook according to the embodiment of the present invention.

Referring to FIG. 7, there illustrated is a front view of the fixed grip with hook 170 according to the embodiment of the present invention. As shown in FIG. 7, the fixed grip 120 and the hook 160 are positioned in the front and back of the extension grip 100, respectively.

Figure 8:
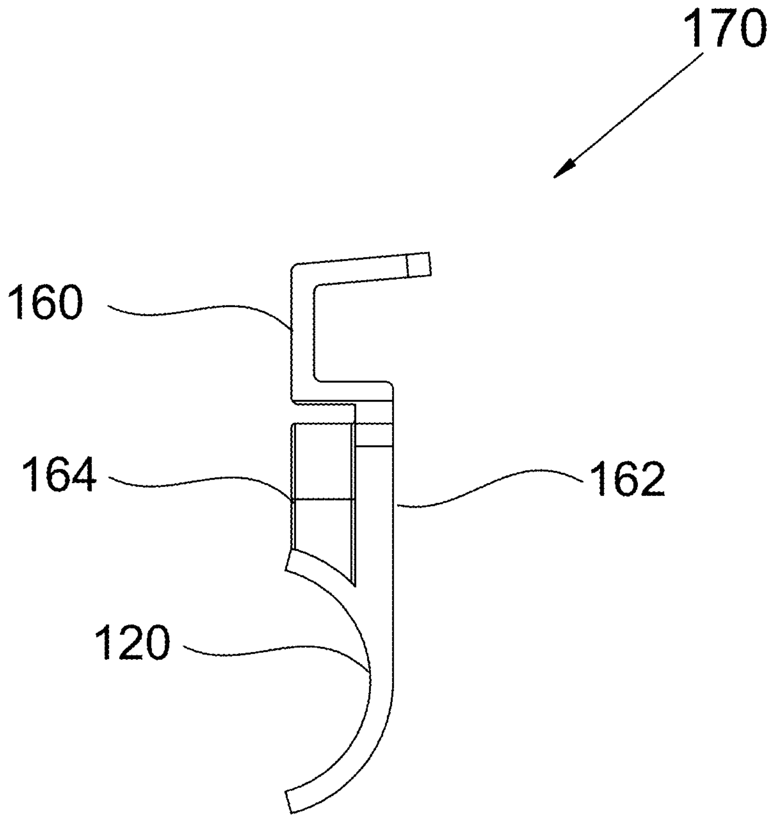
FIG. 8 is a side view of the fixed grip with hook according to the embodiment of the present invention.

Referring to FIG. 8, there illustrated is a side view of the fixed grip with hook 170 according to the embodiment of the present invention. FIG. 8 displays the fixed grip 120 with a semi-circle shape and the hook 160 facing upward. Central hole 164 has a raised platform as compared with the rest of the adjoining section 162.

Figure 9:
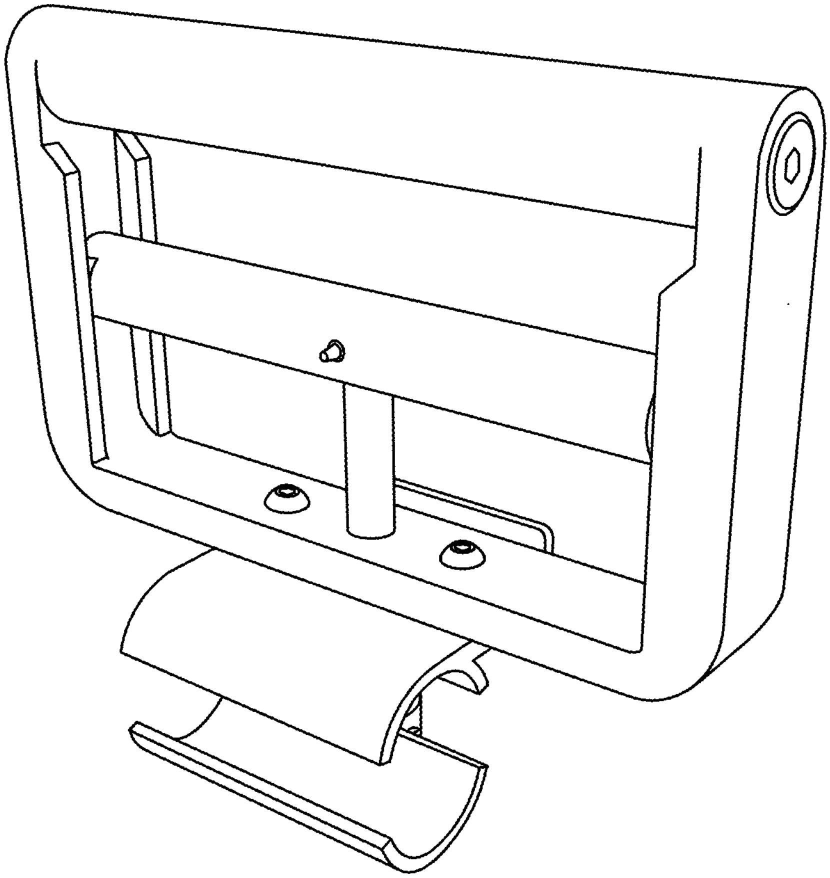
FIG. 9 is a photo of front view of the extension grip for the wheelie bin handle according to the embodiments of the present invention.

Referring to FIG. 9, there illustrated is a photo of front view of the extension grip 100 prototype for the wheelie bin handle according to the embodiments of the present invention.

Figure 10:
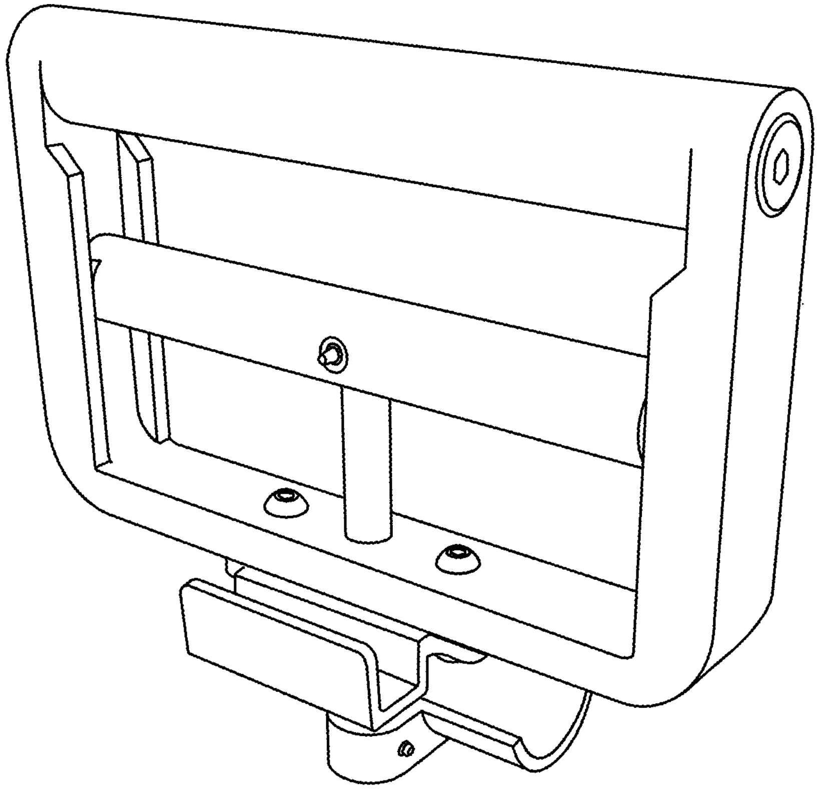
FIG. 10 is a photo of back view of the extension grip for the wheelie bin handle according to the embodiments of the present invention.

Referring to FIG. 10, there illustrated is a photo of back view of the extension grip 100 prototype for the wheelie bin handle according to the embodiments of the present invention.

What is claimed is:

1. An extension grip of a wheelie bin handle comprising:

a frame including a horizontal section and two handle extensions perpendicular to the horizontal section, wherein the horizontal section includes a first central hole located in the center of the horizontal section, and each of the handle extensions includes a track parallel to the longitudinal length of the handle extension, the tracks facing each other for hosting a pull handle slidable along the tracks;

two handlebars including a fixed handle and the pull handle, wherein each end of the fixed handle is attached to an upper part of one of the handle extensions, and the fixed handle is located above the pull handle;

a fixed grip with hook including a fixed grip, a hook, and an adjoining section, the adjoining section including a second central hole, wherein the adjoining section is located between the fixed grip and the hook to connect the fixed grip and the hook into one piece, and the adjoining section is attached to a downward facing surface of the horizontal section of the frame in such a way that the fixed grip and the hook are fixed to the horizontal section of the frame through the adjoining section, the hook is in an upper turned U shape, and the fixed grip and the hook are located on opposite sides of the frame;

a clamp including the fixed grip and a moving grip, wherein the moving grip is movable up and down, performing a clamp function; and a connecting rod perpendicular to the handlebars, the rod passing through the first and the second central holes, one end of the rod attached to the pull handle and the other end of the rod attached to the moving grip such that the movement of the moving grip is controlled by the sliding movement of the pull handle along the track.

2. The extension grip of claim 1, wherein the adjoining section is attached to the down facing surface of the horizontal section of the frame by using multiple screws passing through the down facing surface of the horizontal section and the adjoining section to be screwed with a hexagon nut.

3. The extension grip of claim 1, wherein each end of the fixed handle is attached to the corresponding upper part of the handle extension by a socket counter sunk screw screwed through a socket of the handle extension into a counter sink of the fixed handle.

4. The extension grip of claim 1, wherein each end of the pull handle is shaped to fit into one of the tracks.

5. The extension grip of claim 1, wherein each end of the connecting rod has a pin hole, the one end of the connecting rod is attached to the pull handle by using a pin going through the first pin hole in the end of the rod, and the other end of the connecting rod is attached to the moving grip by using a pin going through the second pin hole in the other end of the rod.

6. The extension grip of claim 1, wherein the extension grip is made of a material selected from a group including metals, metal alloys, and plastics.

7. The extension grip of claim 6, wherein the plastics includes ABS plastics.

* * * * *